(Model.)

J. F. MYERS.
Potato Digger.

No. 235,166.

3 Sheets—Sheet 1.

Patented Dec. 7, 1880.

WITNESSES
Chas. L. Coombes
D. P. Cowl

INVENTOR
John F. Myers
by Suggett & Nottingham (Model.)

J. F. MYERS.
Potato Digger.

No. 235,166.

3 Sheets—Sheet 2.

Patented Dec. 7, 1880.

WITNESSES
Chas. L. Coombes.
D. P. Cowl

INVENTOR
John F. Myers
by Suggett & Nottingham
ATTORNEY (Model.)

J. F. MYERS.
Potato Digger.

No. 235,166.

3 Sheets—Sheet 3.

Patented Dec. 7, 1880.

WITNESSES
C. E. Susby
Jos. W. Graham.

INVENTOR
John F. Myers
by Suggett & Nottingham
ATTORNEYS

UNITED STATES PATENT OFFICE.

JOHN F. MYERS, OF CORTLAND VILLAGE, NEW YORK.

POTATO-DIGGER.

SPECIFICATION forming part of Letters Patent No. 235,166, dated December 7, 1880.

Application filed August 26, 1880. (Model.)

*To all whom it may concern:*

Be it known that I, JOHN F. MYERS, a citizen of the United States, residing at Cortland village, in the county of Cortland and State of New York, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improved apparatus which is specially designed for digging and gathering potatoes, although it is equally applicable to the purpose of gathering stones and the like.

The object of my invention is to provide an apparatus which may be drawn over a field, and a device by means of which potatoes or any substance approximating a potato in size may be automatically uprooted, seized, and carried to a receptacle composed of two segmental sections and automatically discharged into the same, and to provide a means whereby the height of the digging mechanism may be conveniently adjusted, as more fully hereinafter set forth.

Figure 1:
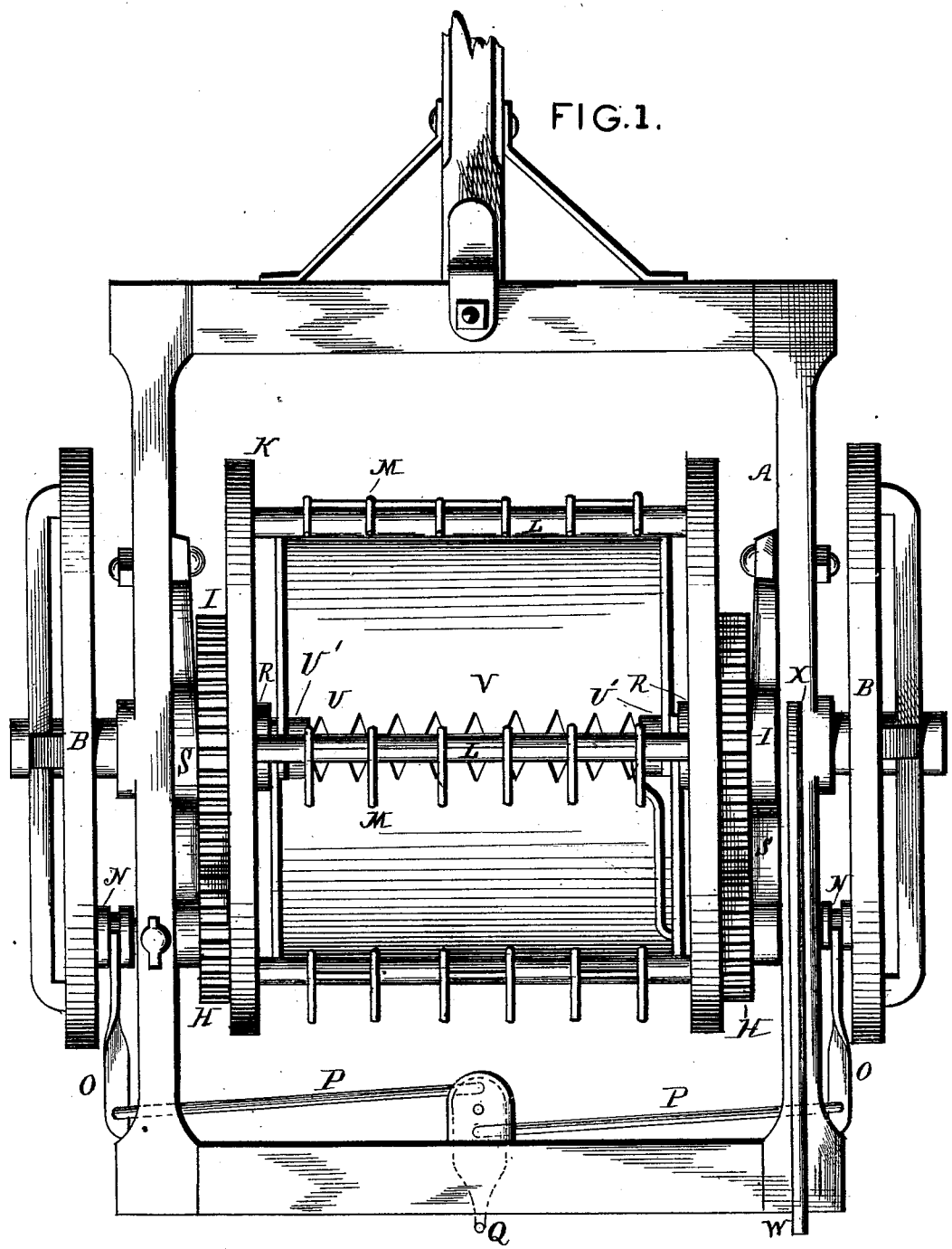
Figure 2:
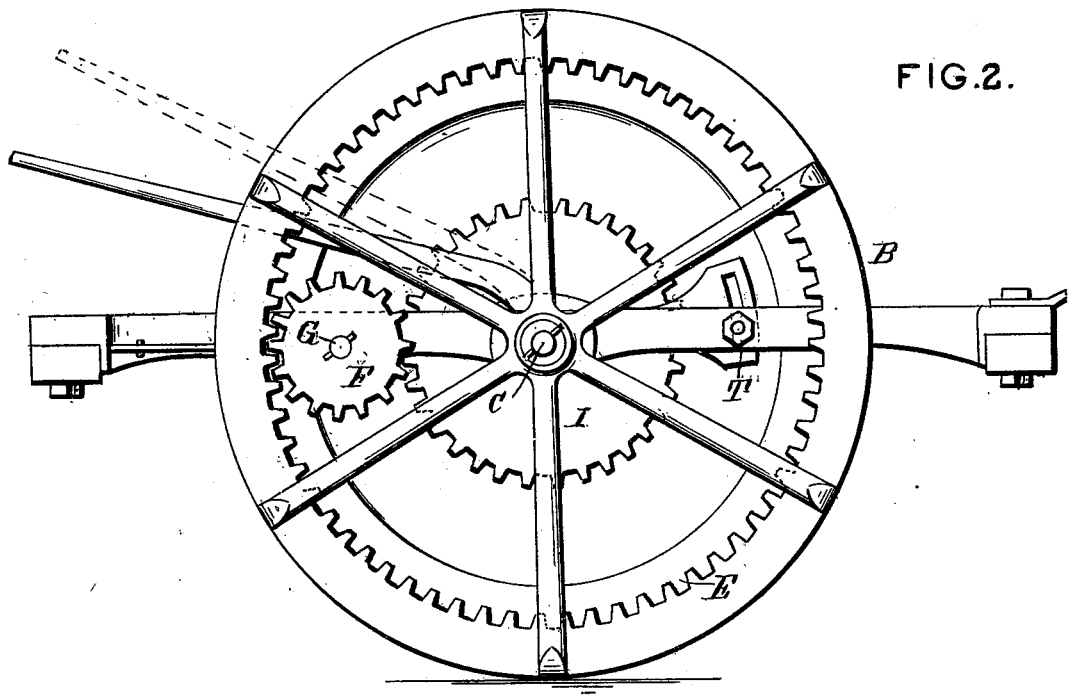
Figure 3:
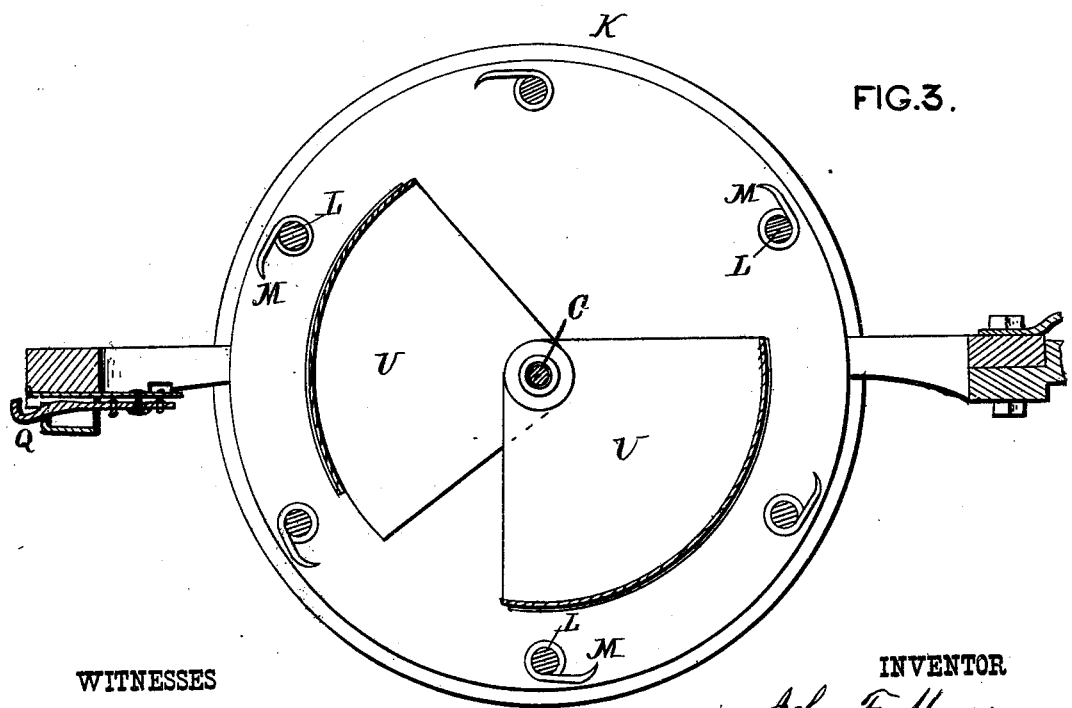
Figure 4:
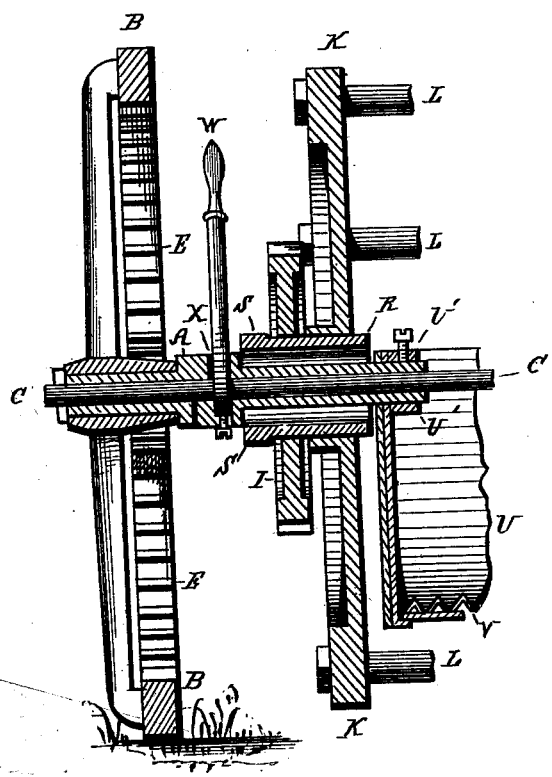

Figure 1 represents a top view of my improved machine; Fig. 2, a side elevation, and Fig. 3 a longitudinal sectional view, showing the receptacle in position for dumping or emptying its contents. Fig. 4 is a longitudinal section of one end of the axle and the bosses secured thereon.

The letter A indicates the frame of the machine, which is of rectangular or any other suitable shape, and constructed of any proper material. The said frame is mounted on wheels B, which turn freely on the axle C. Each wheel is provided with a series of internal cog-teeth, E, the spokes of the wheels being bent and secured to the outer face of the rim of the wheel, in order to permit the said above-mentioned cogs to form a continuous and uninterrupted gear on each wheel, which gears are adapted to intermesh respectively with the cogged pinions F, which are mounted loosely on short shafts G journaled in the frame A.

The said shafts have mounted thereon rigidly cogged pinions H, which intermesh with the gear-wheels I secured to the rotating heads K, which are securely connected by the transverse bars L, which are provided with spring-teeth M, forming a series of rakes or carriers to seize the potatoes or stones, as more fully hereinafter specified.

The shafts G are provided with friction-clutches N, which are adapted, by means of the levers O, connections P, and lever Q, to be thrown into and out of gear with the loose pinions F, in order to throw the working parts of the apparatus into and out of action.

The heads K above mentioned are open at their centers, and are journaled upon bosses R formed on the levers S, which are fulcrumed to the respective shafts G at one end, the other end of each being slotted and adjustably confined to the frame A by a set-screw, T, so that the heads may be elevated or depressed at will to adjust the digging mechanism with respect to the ground to be worked, the opening through the bosses being of such size as to permit a vertical movement about the axle, which passes transversely through the bosses, heads, and across the apparatus.

The letter U indicates the receptacle for the potatoes or stones. This is constructed of two segmental sections, one of which is secured rigidly to the axle and the other to the boss U', through which the axle passes, the two when closed together forming a semi-cylindrical vessel into which the potatoes are carried, as more fully hereinafter specified.

The adjoining lower edges of said sections are serrated, as indicated at V, leaving apertures through which dirt may escape. The axle is provided with a rigidly-secured lever, W, extending through a slot, X, in the frame A, by means of which the section which is rigidly secured to the axle may be caused to move with the axle and elevated so as to open the receptacle at its bottom and discharge the potatoes or stones.

The operation of my invention will be readily understood in connection with the above description, and is as follows: Upon moving the machine forward, the driving mechanism being in proper gear, the heads will be rotated, causing the rakes or carriers to rotate around the receptacle. The rakes as they enter the ground will seize the potatoes and carry the same up against the sides of the front section of the receptacle until they reach the upper edge, when they will be thrown into the same. When it is desired to dump the apparatus the back section of the receptacle is elevated, as before mentioned; and to throw the working mechanism out of gear the friction-clutches are thrown back from their respective pinions by the levers and connections provided for the purpose.

Having thus fully described my invention, what I claim, and desire to secure by Letters Patent, is—

1. In a potato-digger or stone-gatherer, the rotating heads, open at their centers, and suitable actuating mechanism, the rakes or carriers, and the receptacle for the potatoes, composed of two segmental sections, one secured to the axle and the other to a boss through which said axle passes, constructed and adapted to operate substantially as specified.

2. The potato or stone receptacle composed of two segmental sections, one secured to the axle and the other to a boss through which said axle passes, whereby one of said sections may be elevated to dump the contents, substantially as specified.

3. The combination, with the rotating heads, open at their centers, of the levers fulcrumed in the frames and provided with bosses on which the heads are journaled, with the levers S fulcrumed at one end to the shafts G, the other end being slotted and adjustably confined to the frame A, and set-screw T, whereby the height of the digging mechanism and receptacle may be regulated, substantially as specified.

In testimony whereof I affix my signature in presence of two witnesses.

JOHN F. MYERS.

Witnesses:
W. H. SHANKLAND, Jr.,
J. W. SUGGETT.